(12) United States Patent
Sharp et al.

(10) Patent No.: US 12,046,150 B2
(45) Date of Patent: Jul. 23, 2024

(54) MODULAR BATHYMETRY SYSTEMS AND METHODS

(71) Applicant: United States of America as Represented by The Secretary of The Army, Alexandria, VA (US)

(72) Inventors: Jeremy A Sharp, Vicksburg, MS (US); Zachary S Smith, Vicksburg, MS (US); Duncan Bryant, Vicksburg, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 951 days.

(21) Appl. No.: 17/039,777

(22) Filed: Sep. 30, 2020

(65) Prior Publication Data

US 2022/0101754 A1 Mar. 31, 2022

(51) Int. Cl.
G09B 23/12 (2006.01)
(52) U.S. Cl.
CPC .................. G09B 23/12 (2013.01)

(58) Field of Classification Search
CPC ...................................................... G09B 23/12
See application file for complete search history.

(56) References Cited

U.S. PATENT DOCUMENTS

| | | | | |
|---|---|---|---|---|
| 5,653,592 A | * | 8/1997 | Davinroy | G09B 23/40 434/126 |
| 6,298,896 B1 | * | 10/2001 | Sherrill | B29C 43/56 249/161 |
| 9,478,151 B2 | * | 10/2016 | Choi | G09B 23/40 |

* cited by examiner

*Primary Examiner* — Steven W Crabb
(74) *Attorney, Agent, or Firm* — Brian C. Jones

(57) ABSTRACT

In one embodiment, a bathymetry system includes a base slab, multiple spacer assemblies, a decking layer, multiple computer numerical control routed blocks, a waterproof coating, and multiple floor joints. The spacer assemblies are coupled with a top surface of the base slab, the decking layer is disposed on top surfaces of the spacer assemblies, the blocks are disposed on a top surface of the decking layer, floor joints are disposed between blocks and the decking layer, and the waterproof coating is disposed on top surfaces of the blocks. The top surfaces of the routed blocks are shaped so that the blocks collectively provide a bathymetry profile, such as a bottom contour of a riverbed.

19 Claims, 6 Drawing Sheets

MODULAR BATHYMETRY SYSTEMS AND METHODS

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to bathymetry and topography structures, and, more particularly but not exclusively, to modular bathymetry systems and methods for use in modeling water flow.

Description of the Related Art

This section introduces aspects that may help facilitate a better understanding of the invention. Accordingly, the statements of this section are to be read in this light and are not to be understood as admissions about what is prior art or what is not prior art.

Physical models for studying water flow are well known in the engineering industry, and are helpful in analyzing various types of hydraulic phenomena. However, many currently known bathymetry techniques are outdated. Hence, although existing bathymetry approaches may provide value in certain situations, still further improvements in bathymetry technology are desired. Embodiments of the present invention provide solutions for at least some of these outstanding needs.

SUMMARY

The present invention was developed to address the challenges associated with existing bathymetry systems and methods. Exemplary embodiments disclosed herein provide rapid modular construction method for developing bathymetry systems. Such solutions are well suited for use in laboratories and other facilities where the footprint available for the system may be limited or where it is difficult to maintain proper facility upkeep. Bathymetry system embodiments provided herein advantageously provide the ability to construct, test, remove, and store models for future use. In some cases, bathymetry systems involve a fixed bed physical model construction process Exemplary bathymetry solutions disclosed herein are easily reproducible, can meet modern tolerance expectations, and do not require an extensive removal process. Bathymetry embodiments can be used to study flood control, navigation, and has a broad range of applications in the maritime field.

In some cases, a bathymetry system includes CNC routed bathymetry blocks constructed of closed-cell low-density foam (Expanded Polystyrene Foam, EPS). The blocks can be sprayed with polyurea or a polyurea layer for waterproofing and covered with a monolithic waterproof surface. The bathymetry blocks or shells can be placed on stretcher plates leveled to elevation. In some cases, the bathymetry blocks or shells can be placed directly on a monolithic flat concrete slab.

Bathymetry systems disclosed herein rate very well in terms of modularity, survivability, tolerances, cost, and ease of implementation. Exemplary embodiments encompass methods for constructing a modular fixed bed bathymetry for an open channel free-surface scaled physical model. The processed outlined here can be used to replace certain historic legacy methods of fixed bed concrete model construction.

In some cases, a waterway lightweight modeling system can be built using a construction process for modular fixed bed physical models. The innovative process can use Expanded Polystyrene foam (EPS) with a polyurea topcoat. It can be used to replace certain legacy systems of hand molding fixed bed physical models from concrete. In some cases, embodiments involve bathymetry that is routed with a CNC machine thereby making it a repeatable process. With this repeatability, comes the capacity to remake or modify the various bathymetry components to represent prototype changes for testing. In situ foam blocks can be easily and rapidly removed with basic tools, then new foam blocks can be installed and recoated. Additionally, it is less expensive and is a more rapid process, using fewer persons, as compared with certain legacy systems.

The present invention advances the science of bathymetry systems and methods. This disclosure describes a new modular bathymetry systems and methods that are more versatile, adaptable, and effective than prior approaches. What is more, the instant bathymetry systems are simple in construction, economical to fabricate, and easy to use, particularly in a time-efficient manner.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes,"

and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In at least one embodiment, bathymetry systems and methods disclosed herein provide a modular fixed bed physical model construction process that is fast and efficient. Exemplary embodiments can eliminate the need for a large construction crew, can be repeatable, and can be removed and stored. Exemplary embodiments can allow personnel, entities, and organizations to reduce their laboratory footprint producing a leaner and more efficient lab space.

Figure 1:
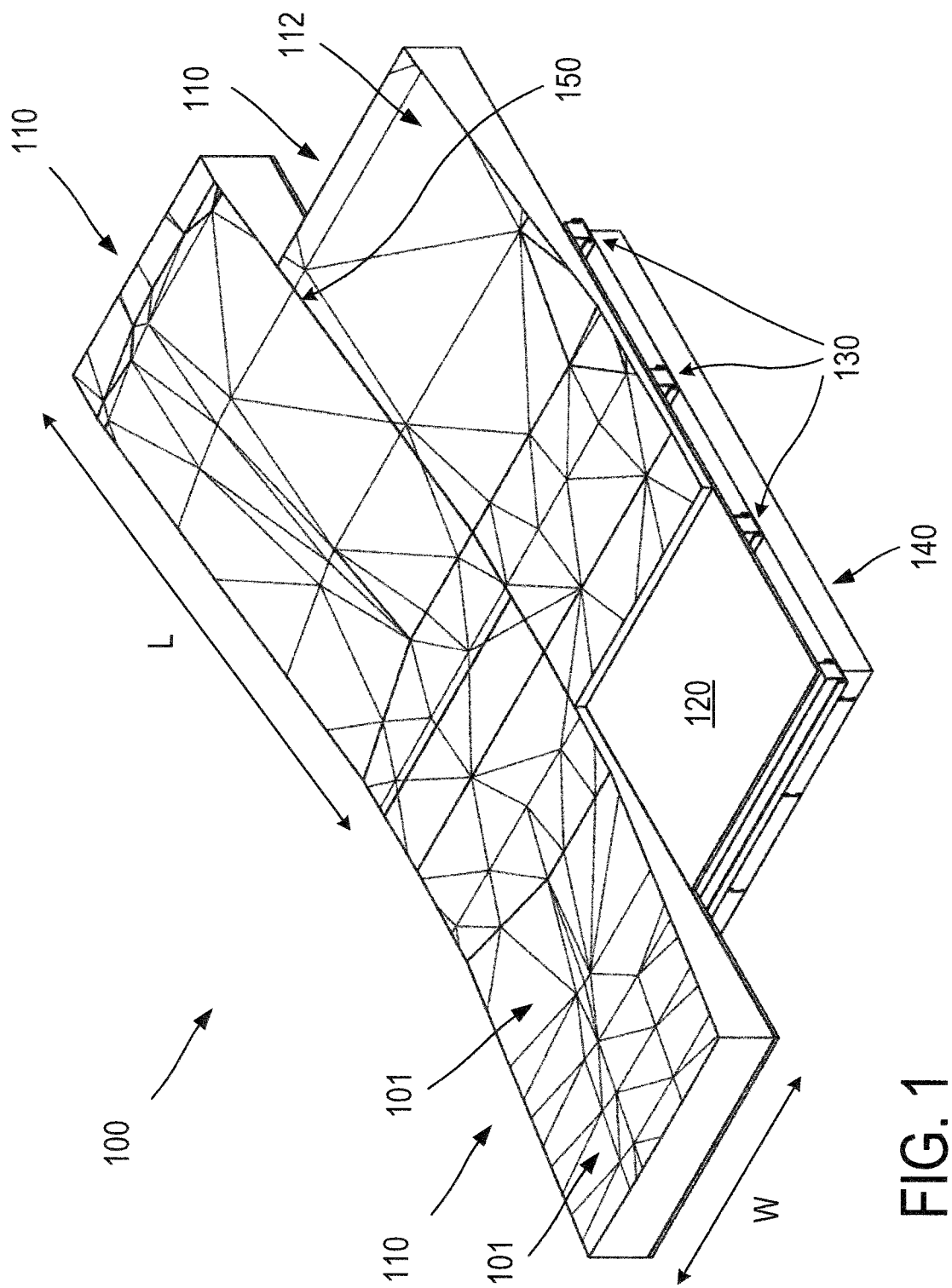
FIG. 1 depicts aspects of a bathymetry system according to certain embodiments of the invention.

Turning now to the drawings, FIG. 1 depicts aspects of a bathymetry system 100 according to embodiments of the present invention. Bathymetry system 100 includes one or more bathymetry blocks 110 disposed on a decking layer 120. The decking layer 120 can be disposed on one or more spacer assemblies 130, which in turn are disposed on a base slab 140. Blocks have one or more cut surface zones or profile areas 101, which collectively provide the bathymetry profile (e.g. bottom contour of a riverbed). Once the system is assembled and a waterproof layer (not shown) is applied over the top surface of the blocks, water or other fluid can be poured or placed into the system, so as to simulate a body of water.

In some cases, a block 110 can have a width W of about 4 feet. In some cases, a block 110 can have a length L of about 8 feet. In some cases, a block 110 can be manufactured from an expanded polystyrene (EPS) foam material. In some cases, a block 110 can have a weight of about 3 pounds per cubit foot. Typically, a portion or the entirety of a top surface 112 of the block 110 has a routed bathymetry profile. In some cases, one or more blocks 110 can be joined or coupled with the decking layer 120 with a silicone material, such as a silicone adhesive.

According to some embodiments, adjacent blocks can be coupled together or otherwise engaged with a control joint 150. In some cases, a control joint 150 can have a width of about 0.125 inches. In some cases, the control joint 150 can be configured to accommodate thermal expansion and/or contraction of the blocks. In some cases, a bathymetry system 100 can include a silicone layer that is painted or otherwise applied over the top surface of a control joint 150. In some cases, adjacent blocks 110 can be silicone 2 inches from the top edge.

Figure 2:
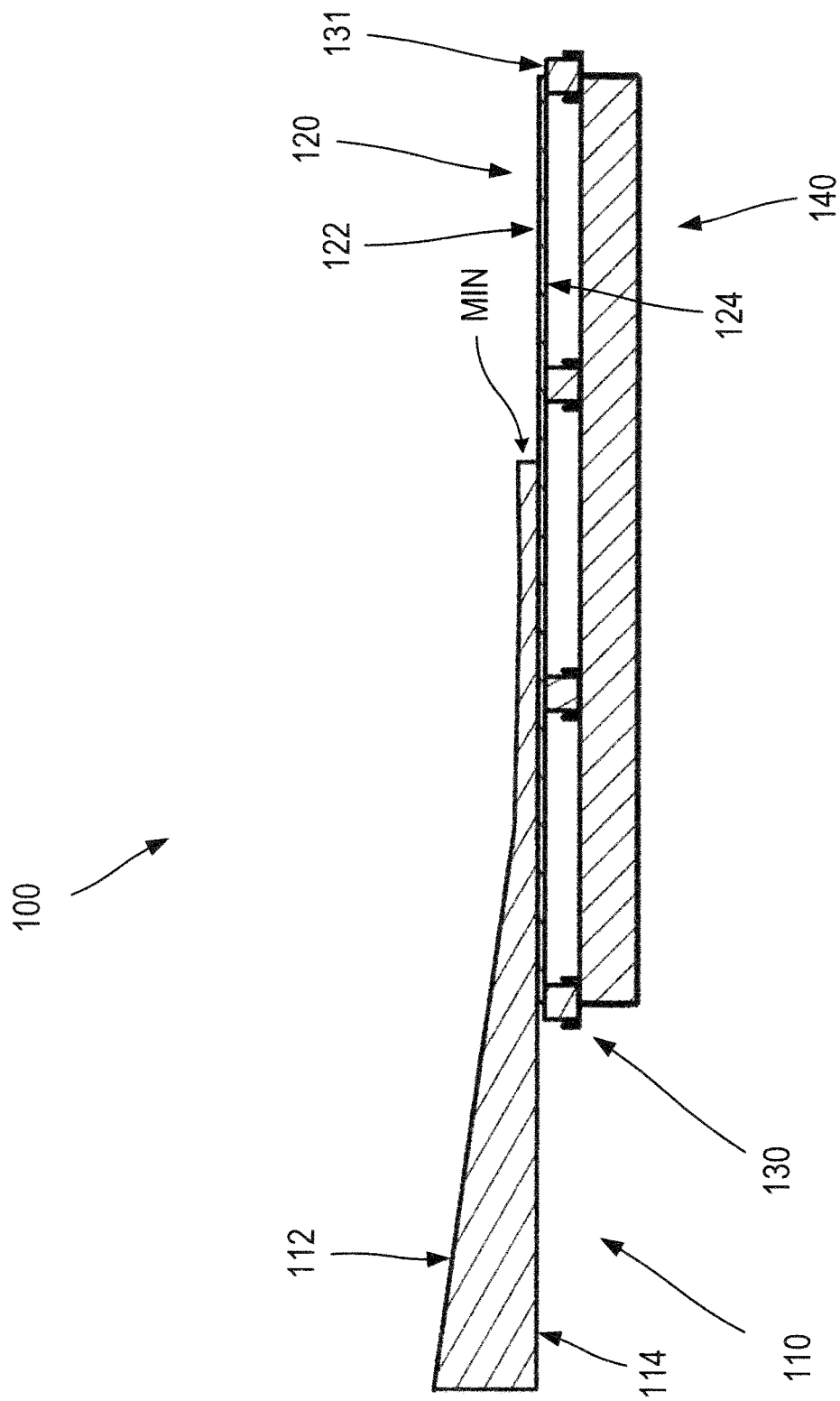
FIG. 2 illustrates aspects of a bathymetry system according to certain embodiments of the invention.

FIG. 2 depicts aspects of a bathymetry system 100 according to embodiments of the present invention. Bathymetry system 100 includes one or more bathymetry blocks 110 disposed on a decking layer or sheathing plane 120. The decking layer 120 can be disposed on one or more spacer assemblies 130, which in turn are disposed on a base slab 140. For example, a block 110 can have a top side or surface 112 and a bottom side or surface 114. Typically, a portion or the entirety of a top surface 112 of the block 110 has a bathymetry profile, such as a routed bathymetry profile. A bathymetry profile can represent the topography of the floor or bottom surface of a body of water or portion thereof, such as a river, canal, lake, sea, ocean, lake, or the like. This could include features of coastlines, estuaries, watersheds, and the like. A decking layer 120 can have a top side or surface 122 and a bottom side or surface 124. According to some embodiments, the bottom surface 114 of a block 110 can be coupled with or adhered to the top surface 122 of a decking layer 120. For example, a block 110 can be joined or coupled with the top surface 122 of the decking layer 120 using a silicone material, such as a silicone adhesive. As shown here, a block can have a minimum thickness MIN. In some cases, the minimum thickness MIN has a value within a range from about 2 inches to about 3 inches. In some cases, the top surface 112 of a block 110 can be waterproofed. For example, a portion or the entirety of the top surface 112 can be coated with a 10 mil waterproof polymer paint. Control joints between adjacent blocks can be silicone with paintable silicone. In some cases, a second 10 mil coat of waterproof polymer paint can be applied. Further, a 60 mil topcoat of polyurea can be applied. The term "mil" can refer to one thousandth of an inch (0.001 inch). As shown here, the decking layer 120 can be disposed on a top surface 131 of one or more spacer assemblies 130.

Figure 3:
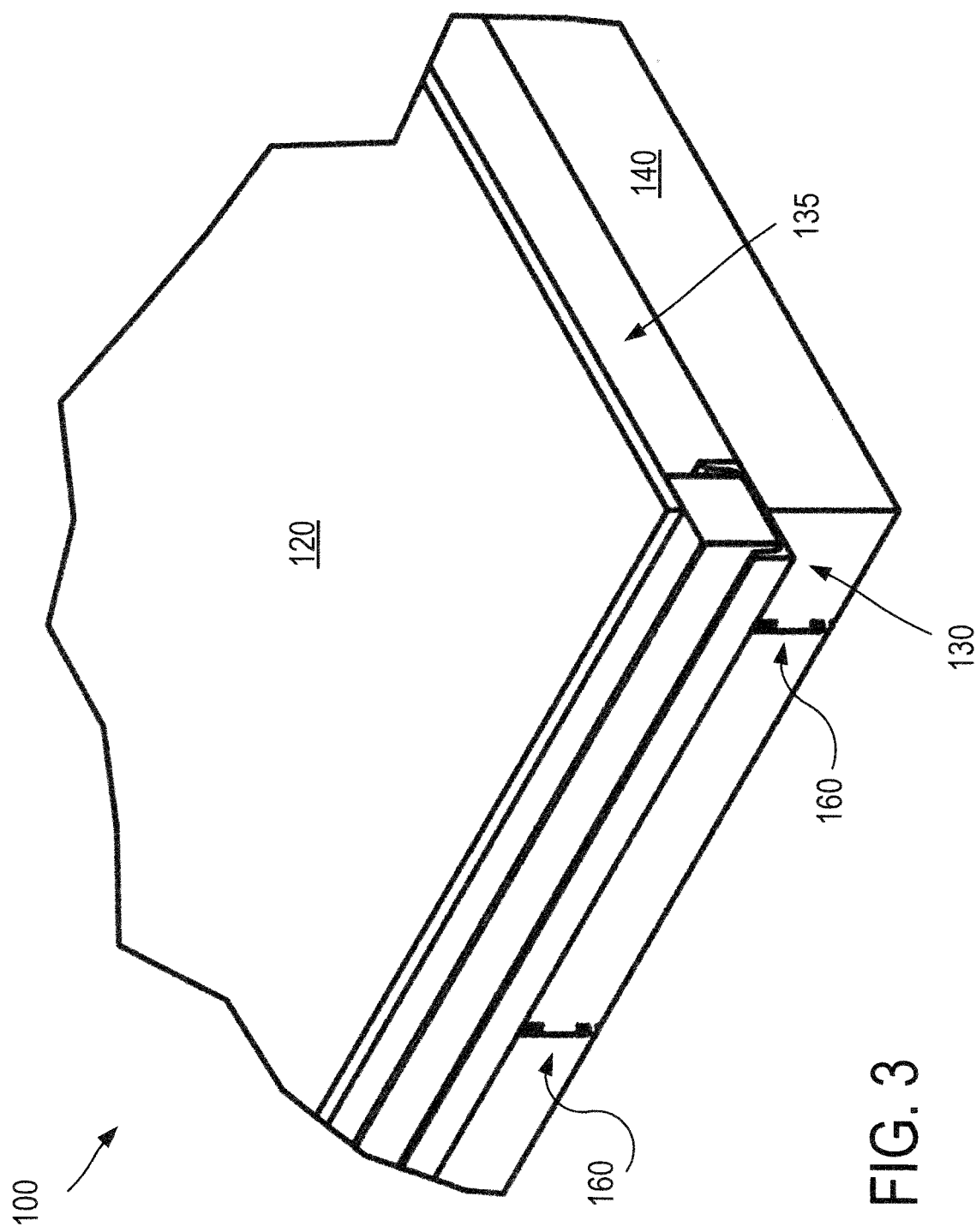
FIG. 3 illustrates aspects of a bathymetry system according to certain embodiments of the invention.

FIG. 3 depicts aspects of a bathymetry system 100 according to embodiments of the present invention. Bathymetry system 100 includes one or more bathymetry blocks (not shown) disposed on a decking layer 120. In some cases, the decking layer 120 includes one or more sheets of plywood. The decking layer 120 can be disposed on one or more spacer assemblies or stretcher plates 130, which in turn are disposed on a base slab 140. In some cases, the spacer assemblies or stretcher plates 130 can be a semi-permanent feature of a modular test floor. The presence of the spacing assembly 130 can provide an air void 135 between the decking layer or sheathing 120 and the base slab 140. In some case, the base slab 140 can be a concrete slab. The air void 135 can operate to allow for the exit or drainage of leaks (e.g. fluid which may seep through a hole in a block or through a seam between two adjacent blocks). Such drainage can help to prevent water from accumulating. In some cases, the decking layer 120 has a thickness T that is about ¼ inches. In some cases, the decking layer 120 includes Zip System® sheathing panels. For example, 7/16 inch 4 feet by 8 feet panels, ½ inch 4 feet by 8 feet panels, or ¾ inch 4 feet by 8 feet panels. The decking layer 120 can also include Zip System® flashing tape, such as 3¾ inch flashing tape, 6 inch flashing tape, or 9 inch flashing tape. In some cases, the decking layer 120 can include one or more sheathing panels and flashing tape, and can be coated with a 10 mil layer of water proof polymer (e.g. unexposed/decking that water does not touch) and a 20 mil layer of water proof polymer (e.g. exposed/decking). Bathymetry system 100 can also include wedge anchors 160. In some cases, wedge anchors can be ⅜ inches by 7 inches, and arranged 2 feet on center. In some cases, wedge anchors 160 can operate to secure a spacer assembly 130 to a base slab 140. In some cases, a system may not include spacer assemblies, and the decking layer 120 can be placed directly on the concrete slab 140, for example where the slab 140 has been laser screeded or otherwise contoured or etched, so that any water or fluid that may leak through the decking layer 120 can drain off the upper surface of the slab 140. For example, the top surface of the slab 140 may include built in channels that allow for fluid run-off or drainage. In some cases, a slab 140 can be a permanent asset, and can support multiple different types of models, for example as various sets of block assemblies are removed and replaced. For example, a river model having one set of blocks can be removed, and replaced with a lake model having another set of blocks.

Figure 4:
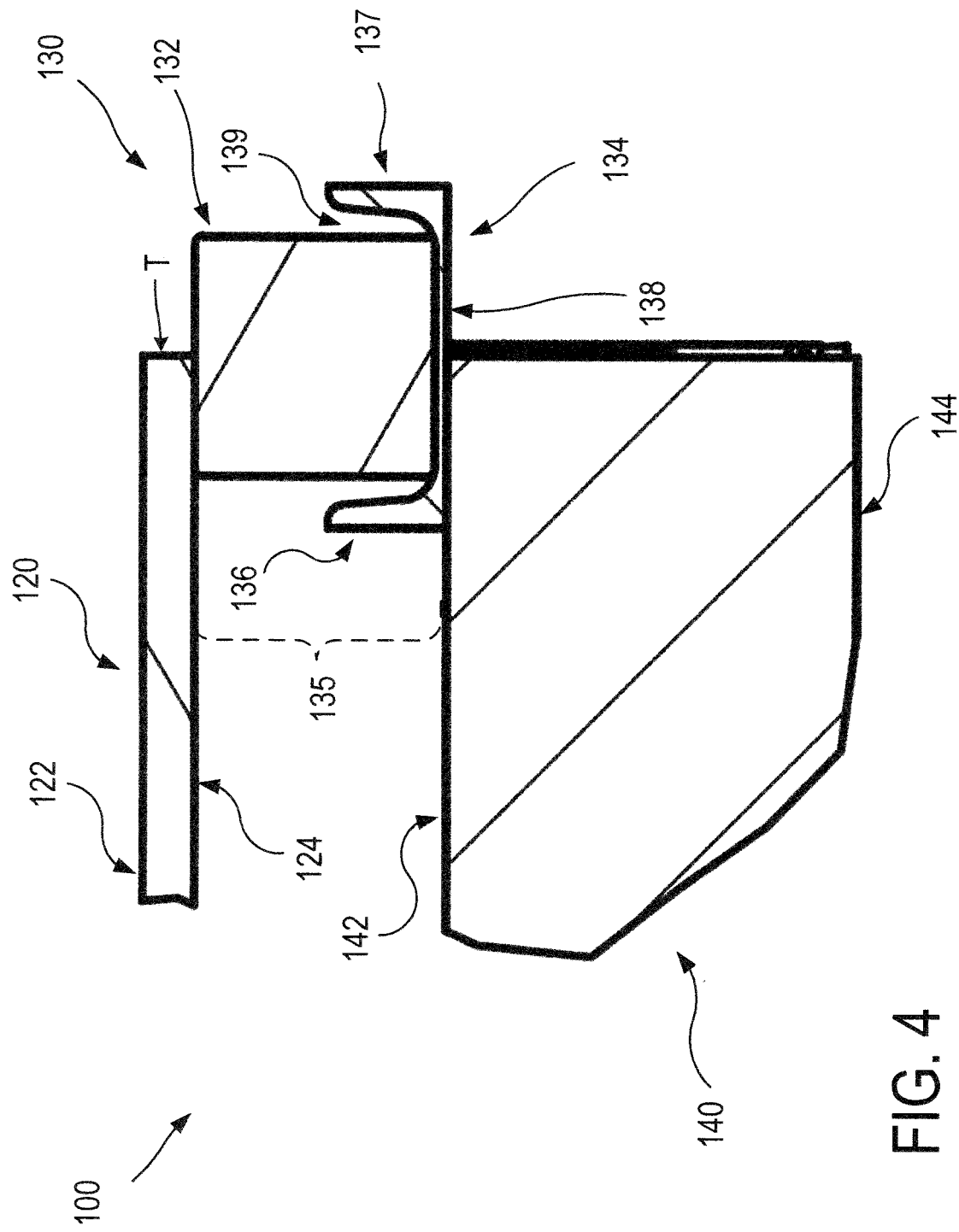
FIG. 4 illustrates aspects of a bathymetry system according to certain embodiments of the invention.

FIG. 4 depicts aspects of a bathymetry system 100 according to embodiments of the present invention. Bathymetry system 100 includes one or more bathymetry blocks (not shown) disposed on a decking layer 120. The decking layer 120 can be disposed on one or more spacer assemblies 130, which in turn are disposed on a base slab 140. A spacer assembly 130 can include a spacer 132 and a holder 134. As shown here, the holder 134 can include a first wall 136, a second wall 137, and a floor 138. The walls and floor can create a channel 139 that contains, holds, or otherwise stabilizes the spacer 132. In some cases, a wall can have a height of about 1¾ inches. In some cases, a spacer 132 can be a 4 inch by 4 inch ground contact pressure treated, edge joined timber. The presence of the spacing assembly 130 can provide an air void 135 between the decking layer or sheathing 120 and the base slab 140. In some case, the base slab 140 can be a concrete slab. The air void 135 can operate to allow for the exit of leaks (e.g. fluid which may seep through a hole in a block or through a seam between two adjacent blocks). In some cases, the decking layer 120 has a thickness T that is about ¾ inches. In some cases, the decking layer 120 includes Zip System® sheathing panels. For example, 7/16 inch 4 feet by 8 feet panels, ½ inch 4 feet by 8 feet panels, or ⅝ inch 4 feet by 8 feet panels. The decking layer 120 can also include Zip System® flashing tape, such as 3¾ inch flashing tape, 6 inch flashing tape, or 9 inch flashing tape. In some cases, the decking layer 120 can include one or more sheathing panels and flashing tape, and can be coated with a 10 mil layer of water proof polymer (e.g. unexposed/decking that water does not touch) and a 20 mil layer of water proof polymer (e.g. exposed/decking). In some cases, the height or one or more spacer assemblies 130 can be adjusted (e.g. by adjusting the height of the spacer and/or the holder floor 138) so as to make the decking layer 120 lay flat or level (e.g. no slope or incline). Base 140 includes a top surface 142 and bottom surface 144.

Figure 5:
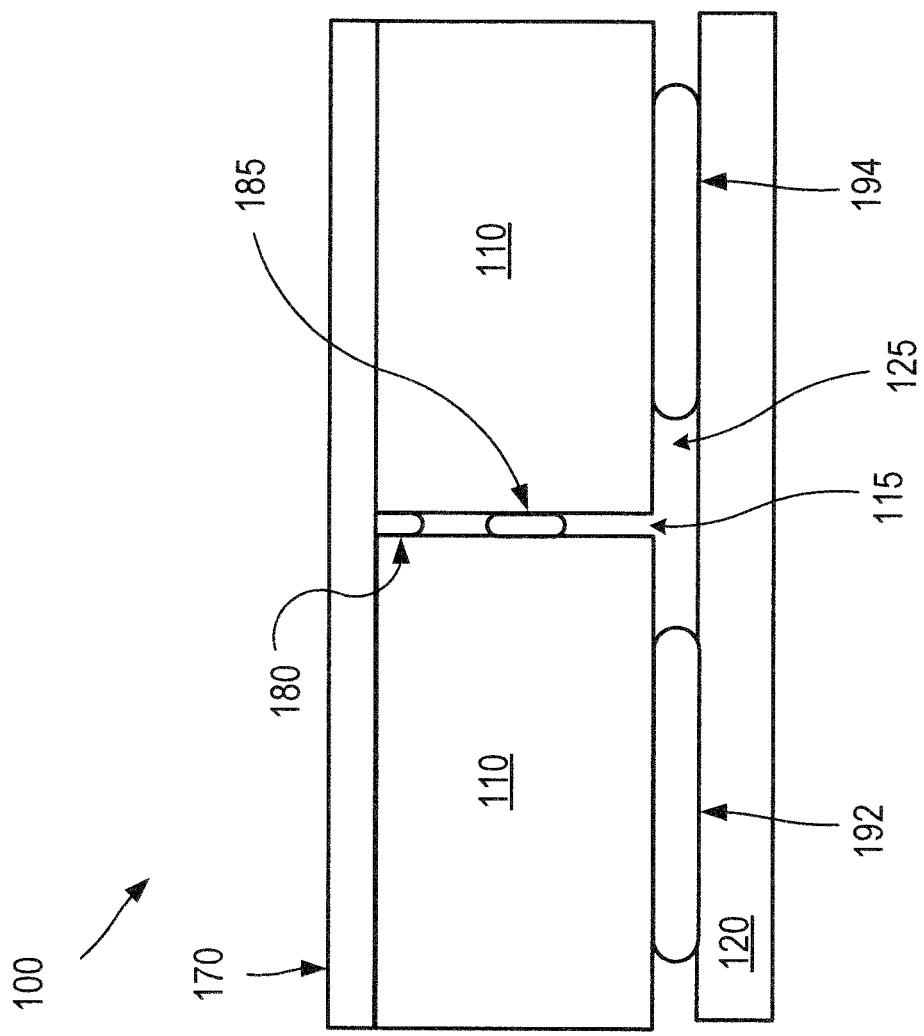
FIG. 5 illustrates aspects of a bathymetry system according to certain embodiments of the invention.

FIG. 5 depicts aspects of a bathymetry system 100 according to embodiments of the present invention. Bathymetry system 100 includes one or more bathymetry blocks 110 disposed on a flat floor or decking layer 120. The blocks may be EPS foam blocks. The decking layer 120 can be disposed on one or more spacer assemblies (not shown), which in turn are disposed on a base slab (not shown). In some case, the base slab 140 can be a concrete slab. A waterproof coating 170, such as a polyurea coating, can be distributed over the top surfaces of the blocks 110. Advantageously, in some cases, the coating 170 is a removable coating. In some cases, the coating 170 provides sufficient grip with the underlying blocks, so that the coating does not become dislodged or separated from the blocks during testing. Similarly, the coating 170 can be removably adherable to the blocks, so that when desired, the coating 170 can be easily peeled or otherwise removed from the blocks following use. The coating 170 can provide a waterproof membrane over the blocks. Further advantageously, the coating 170 can provide structural rigidity to the system, such that a person can walk on the upper surface of the system, and the coating 170 can provide support to the person, and also prevent the person's weight from crushing or otherwise deforming the blocks beneath the coating 170. In some cases, the coating 170 can be applied in a series of multiple applications of coating material (e.g. polyurea). In some cases, each application of coating material can dry in about 30 seconds following application. In some cases, one or more applications can be delivered (e.g. spray gun) via a textured spray technique.

In some cases, a system can include a layer of waterproof paint (e.g. polymer paint, not shown) between the blocks 110 and the coating 170. The system 100 may include a paintable silicone control joint 180 at the top of a space 115 between the blocks 110. The system 100 may also include a silicone (e.g. 100% silicone) intermediate control joint 185 in a space 115 between the blocks 110 and below the top control joint 180. In some cases, the coating 170 has a thickness of about 0.135 inches. In some cases, the coating 170 has a thickness of about 0.120 inches. In some cases, the space 115 has a width of about 0.125 inches. In some cases, the distance between the bottom surface of the coating 170 and the top portion or edge of the control joint 185 is about 2 inches. The system 100 may also include floor joints 192, 194 disposed in a space 125 between the blocks 110 and the decking layer 120. In some cases, the floor joints may be silicone (e.g. 100% silicone) floor joints. The silicone connections can be easily disengaged, so that the system can be efficiently disassembled following use. In some cases, coating 170 includes a polyurea material. A polyurea material can be derived from the reaction product of an isocyanate component and a synthetic resin blend component through step-growth polymerization. The isocyanate can be aromatic or aliphatic, and can be monomer, polymer, or any variant reaction of isocyanates, quasi-prepolymer or a prepolymer. The prepolymer, or quasi-prepolymer, can be made of an amine-terminated polymer resin, or a hydroxyl-terminated polymer resin.

According to some embodiments, a bathymetry system can include Expanded Polystyrene foam (EPS) blocks that are top coated with a polyurea waterproof coating. Foam blocks (e.g. 4 feet width, 8 feet length) can be both lightweight and cost-effective. For example, two persons can easily carry a single block. Further, the material of the block can be easily machined or routed with surface features or contours. In some cases, the polyurea coating may be much lighter weight than a similar layer fiberglass. Additionally, EPS machines easily and is readily moved/handled without machinery. The EPS foam blocks can have the scaled bathymetry routed into them with a computer numerical control (CNC) router. The bathymetry can be taken directly from a prototype, scaled and sub-divided. This along with the CNC routing can provide a high tolerance bathymetry creation accurately representing a prototype and is repeatable. Multiple foam blocks can be routed to form a full physical model domain. The blocks can be placed on a flat plywood deck or may be placed on a laser screeded concrete slab. Polyurea, a two-part component coating, can be applied as a protective topcoat. The polyurea is a material formulated from isocyanate and amine resin and can provide waterproofing to the EPS foam bathymetry blocks. With the polyurea coating, the EPS foam can be walked on, movable material may be placed on it, and it can endure hydraulic pressures and shear forces during testing. The coating can help to prevent unwanted pressure or impact load damage from occurring to the blocks. Once model testing is done the foam blocks can be removed and saved for future use, or the foam blocks can be recycled. In some cases, EPS blocks can have a compressive strength of about 60 psi. Exemplary bathymetry systems disclosed herein can be flexible, with varying levels of application.

In some embodiments, prototype bathymetry data in XYZ .txt format can be used to generate foam blocks. Data application to the model can be direct or can occur after trimming, thinning and/or smoothing. One approach to thinning/smoothing and to minimize facets in the finished model bathymetry is to apply the prototype bathymetry to a meshed surface via SMS. The meshed surface triangulation size can be 30% of the CNC router bit diameter (1" or 1.5") and can correspond to the tool path step. The prototype bathymetry data can be interpolated to the mesh and is inserted into a computer-aided design (CAD) program for solid feature extrusion and scaling. In some cases, after bathymetry data is appropriately inserted into the CAD program, further detail editing and foam block formation can be performed. Often, a surveyed model space perimeter (e.g. the basin/domain or area that the model is being constructed in) is inserted into the same CAD file, scaled up and positioned to correspond to the prototype. Here, hydraulic structures and other hard features (not to be included in the foam bathymetry) are appropriately trimmed out. Then within the model space perimeter, the area is sectioned off into 47 inch×95 inch sections. At this point, it may be desirable to number the sections for bookkeeping and construction purposes.

In some cases, EPS foam blocks can be sized as 48 inches by 96 inches. In some cases, the blocks can have varying thicknesses (e.g. available in 2-inch increments, with a maximum thickness of 36 inches. In some cases, gaps or spaces between adjacent blocks can be between ⅛ inches and ¼ inches. Such spaces or gaps can serve as or operate in conjunction with control joints so as to accommodate for thermal contraction and expansion. In some cases, a surface is applied to each section using the prototype XYZ data. Once the surface is formed then the blocks can be extruded to the elevation of the flat flooring/deck. In some case, the application thickness of polyurea and polymer paint at can be 135 mils (0.135 inches), and a $17/128$ inch to ⅛ inch grade allowance can be implemented. In some cases, if a subsurface grade is an elevation of 100 feet and model scale, Lr, is 25 then the elevation to extrude the surface to is 100.25 feet.

In some cases, prototype data can be converted to solid feature foam blocks, and these features can be scaled to model in inches (12/Lr) and moved to the origin. In some cases, a rotation may be desired to obtain a more convenient orientation. Once appropriately positioned and scaled each block can be exported as either an OBJ or STL file form for the transfer into the CNC required toolpath.

In some cases, a raw EPS foam block can be trimmed (e.g. <½" on five sides) on a CNC wire cutter to the final block dimension. The sixth face of the trimmed block can be routed on the CNC router to cut out the model scale bathymetry. In some cases, the route time for a 47 inch by 95 inch block is between about 30 minutes and about 55 minutes. In some cases, the variation in router time can correspond to a router bit size and router bit step (specified as a percentage of bit diameter). For blocks requiring greater height than 16", contact cement can be used to adhere multiple EPS foam blocks together after the routing has been done.

In some cases, before or during the block routing, a flat floor/deck can be constructed in a model space and surveyed to grade (e.g. +/−0.002 feet). In some cases, the deck grade can be set to the elevation of the extruded block minus the ⅛ inch allowance for polyurea. Thus, the elevation of 100' can be applicable for the deck grade. Additionally, any hydraulic structure in the model can be appropriately placed. Once in place, holes can be drilled to allow any model leakage to evacuate from under the foam. Then the deck surface can be painted with 10 mils of waterproof polymer paint.

According to some embodiments, the layout of the foam blocks can be denoted on the flat deck and correspond to the numbering of the sections as described elsewhere herein. Such a denotation can be done with chalk lines. As the blocks are finished in the routing process they can be matted with their adjacent neighbors to verify contour alignment and that there is no vertical disagreement between adjacent blocks. Once the foam blocks are routed and the model space is ready, the placement of the foam blocks can start. For example, the area where the block is to be laid can be cleared of any debris, a bead of silicone (e.g. floor joint) can be applied two inches in from the perimeter of the layout lines, the blocks being laid can be placed in the appropriate layout location and aligned with the layout lines, and screw-in anchors with 2-inch washers can be countersunk and used either in a toe anchor position or through the face of the foam blocks.

Figure 6:
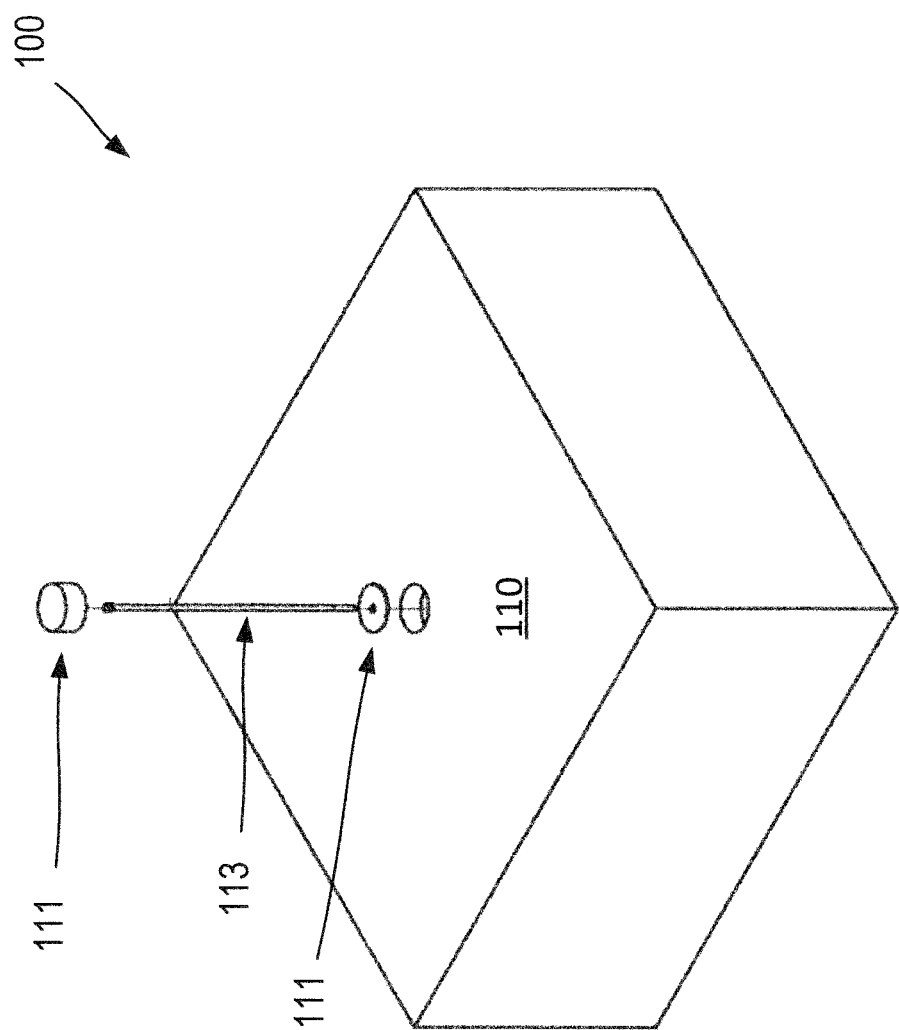
FIG. 6 illustrates aspects of a bathymetry system according to certain embodiments of the invention.

FIG. 6 provides an anchor detail of aspects of a bathymetry system 100, for an attachment to a plywood floor. As shown here, when going through the face of a foam block 110, a plug 111 (e.g. 2-inch EPS plug) can be used to re-establish a continuous top surface. These plugs can be flush cut or sanded smooth with the surrounding grade and may be a minimum of 1 inch thick after they have been flushed with the top surface. Silicone can be used to hold the plugs in place and fill any voids in the circumference around the plug. In some cases, one or more anchors 113 (e.g. screw-in anchors) can be placed on relatively flat bathymetric features, along with washers 117. Additionally or optionally, joint compound can be used to fill in voids. In some cases, bathymetry systems may have one anchor per 8 square feet or a minimum of two anchors per block.

According to some embodiments, for adjacent foam block joints, silicone can be applied to the affixed/existing foam block side, see e.g. FIG. 5. The silicone on the side of an existing block can be placed 2-inches from the top surface following the contour of that existing side. Between the blocks, a ⅛ inch control joint spacing can be maintained to accommodate for thermal expansion and contraction. Once the blocks are in place, sanding and smoothing between adjacent blocks can be performed to smooth out any discrepancies or unrealistic facets. Later, the control joints between adjacent blocks can be filled with paintable silicone caulk.

In some cases, for the application of the polyurea, all voids in the EPS foam layout can be filled. In some cases, the control joints can be filled with paintable caulk, and there may be other locations where there are pinholes or gaps. An air void may keep the polyurea from proper coverage generating holes in the polyurea. Thus, polymer waterproof paint can be applied before the application of the polyurea. Sufficient dry times for the paint may be strictly followed. Any wet paint may cause the polyurea to dry improperly, forming air bubbles on the surface. Once the bathymetry is dry and clean, the polyurea can be applied. To achieve the 0.125 inch thickness, seven spray passes/layers can be applied. These several layers can be sprayed in a one, three, three-layer system. In some cases, regardless of the spraying strategy used, it may be desirable to provide a first sprayed layer that is thin, with sufficient time to flash-off (1-5 min depending on temperature, humidity, and dew point). The flash-off time can be the waiting time taken to recoat or spray once a first coat is applied on a material. It may be desirable to avoid heat build-up between the layers, where additional layers can form pinholes, thus compromising the waterproofing properties. After the application of the polyurea, a topcoat can be added. The topcoat can vary from a polyurea specific chemical and UV resistant layer to simply a high-quality latex paint for aesthetics.

Bathymetry systems and methods as disclosed herein can be used for river flood control structures, river control low sills, and river replacement structures. In some cases, a four by four treated timber can be bolted to the floor, then a two by twelve-floor joist (e.g. straight line ripped on the top edge and surveyed to grade) can be attached to the four by four.

The flat decking can be placed on top of the two by twelve. The decking can be secured and a perimeter wall can be built, for example to encompass the entire model domain. Foam blocks can be placed on the flat deck. The foam blocks are secured with silicone and anchor screws. Polyurea can be applied to the surface, and the polyurea can be painted with a tented waterproof polymer paint.

As will be appreciated by one of ordinary skill in the art, the present invention may be embodied as an apparatus (including, for example, a system, a machine, a device, and/or the like), as a method (including, for example, a business process, and/or the like), or as any combination of the foregoing.

Embodiments of the invention can be manifest in the form of methods and apparatuses for practicing those methods.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A bathymetry system, comprising: a base slab having a top surface; a first spacer assembly and a second spacer assembly; a decking layer; a first block and a second block; a waterproof coating; a first floor joint and a second floor joint; and an intermediate control joint and a top control joint, wherein the first spacer assembly and the second assembly are coupled with the top surface of the base slab, wherein the decking layer is disposed on a top surface of the first spacer assembly and on a top surface of the second spacer assembly, wherein the first block and the second block are disposed on a top surface of the decking layer, wherein the first floor joint is disposed between the first block and the decking layer, wherein the second floor joint is disposed between the second block and the decking layer, and wherein the intermediate control joint and the top control joint are disposed between the first block and the second block, and wherein the waterproof coating is disposed on a top surface of the first block and on a top surface of the second block.

2. The system according to claim 1, wherein the first block and the second block each comprise a closed-cell low-density foam material.

3. The system according to claim 1, wherein the first block and the second block each comprise an expanded polystyrene foam material.

4. The system according to claim 1, wherein the waterproof coating comprises a polyurea material.

5. The system according to claim 1, wherein the first spacer assembly comprises a spacer and a holder.

6. The system according to claim 5, wherein the holder comprises a first wall, a second wall, and a floor, wherein the first wall, the second wall, and the floor form a channel, and wherein the spacer is positioned at least partially within the channel.

7. The system according to claim 5, wherein the spacer comprises a 4 inch by 4 inch timber.

8. The system according to claim 1, wherein the presence of the first spacing assembly and the second spacing assembly provides an air void between the decking layer and the base slab.

9. The system according to claim 1, wherein the top surface of the base slab is laser screeded.

10. A method of manufacturing a bathymetry system, the method comprising: placing a first spacer assembly and a second assembly on the top surface of a base slab; placing a decking layer on a top surface of the first spacer assembly and on a top surface of the second spacer assembly; placing a first block and a second block on a top surface of the decking layer; and applying a waterproof coating to a top surface of the first block and to a top surface of the second block;

further comprising placing a first floor joint between the first block and the decking layer, placing a second floor joint between the second block and the decking layer, placing an intermediate control joint between the first block and the second block, and placing a top control joint above the intermediate control joint and between the first block and the second block.

11. The method according to claim 10, wherein the first block and the second block each comprise a closed-cell low-density foam material.

12. The method according to claim 10, wherein the waterproof coating comprises a polyurea material.

13. The method according to claim 10, wherein the presence of the first spacing assembly and the second spacing assembly provides an air void between the decking layer and the base slab.

14. A method of manufacturing a bathymetry system, the method comprising: placing a first spacer assembly and a second assembly on the top surface of a base slab; placing a decking layer on a top surface of the first spacer assembly and on a top surface of the second spacer assembly; placing a first block and a second block on a top surface of the decking layer; and applying a waterproof coating to a top surface of the first block and to a top surface of the second block; wherein the first spacer assembly comprises a spacer and a holder, wherein the holder comprises a first wall, a second wall, and a floor, wherein the first wall, the second wall, and the floor form a channel, and wherein the spacer is positioned at least partially within the channel.

15. A bathymetry system, comprising: a base slab having a top surface that channels fluid for drainage; a decking layer; a first computer numerical control routed block and a second computer numerical control routed block; a waterproof coating; a first floor joint and a second floor joint; and an intermediate control joint and a top control joint, wherein the decking layer is disposed on the top surface of base slab, wherein the first block and the second block are disposed on a top surface of the decking layer, wherein the first floor joint is disposed between the first block and the decking layer, wherein the second floor joint is disposed between the second block and the decking layer, and wherein the intermediate control joint and the top control joint are disposed between the first block and the second block, and wherein the waterproof coating is disposed on a top surface of the first block and on a top surface of the second block.

16. The system according to claim 15, wherein the top surface of the base slab is laser screeded.

17. The system according to claim 15, wherein the top surface of the base slab is etched.

18. The system according to claim 15, wherein the first block and the second block each comprise a closed-cell low-density foam material.

19. The system according to claim 15, wherein the waterproof coating comprises a polyurea material.

* * * * *